June 30, 1970 A. W. FAURE 3,517,696

SAFETY VALVE

Filed Sept. 6, 1968

INVENTOR.
Alphonse W. Faure

BY

Paul + Paul
ATTORNEYS.

ID="page_1"
United States Patent Office 3,517,696
Patented June 30, 1970

---

3,517,696
SAFETY VALVE
Alphonse W. Faure, Philadelphia, Pa., assignor to
C.S.S. Machine & Tool Co., Inc., Philadelphia, Pa.,
a corporation of Pennsylvania
Filed Sept. 6, 1968, Ser. No. 757,895
Int. Cl. F16k 11/12
U.S. Cl. 137—596                                   4 Claims

---

ABSTRACT OF THE DISCLOSURE

Safety valves are provided for a cam-controlled multiple valve block which controls the distribution of compressed air to various parts of automatic equipment. The safety valve shuts off the air supply to the cylinder. Additionally, in the off position, the valve provides a vent to the atmosphere to allow any air leaking through to reach the cylinder.

---

BACKGROUND OF THE INVENTION

In complex automated manufacturing machinery, as for example, in automatic glassware or bottle-making machinery, compressed air is employed to operate in coordinated time relationship the various component sections of the complex machine. A cam operated multiple valve block is employed to control the distribution of the compressed air. This valve block may have as many as nineteen control valves, operated by timer cams. When repairs are to be made, the hazard exists in the prior art equipment that the repairman's hand may be damaged by unwanted movement of a component part resulting from trapped compressed air.

SUMMARY OF THE INVENTION

In accordance with the present invention, the plugs conventionally supplied for the control valves of the valve block are replaced by safety valves which the repairman turns 90° to close communication between the common source of compressed air in the manifold and that particular one of the compressed air passages which feeds to the particular section of the equipment on which he is going to work. When the safety valve is so turned 90° to close the aforesaid communication, a normally-closed vent to atmosphere is opened, thereby venting to atmosphere any trapped compressed air.

DESCRIPTION OF THE PREFERRED EMBODIMENT

Figure 1:
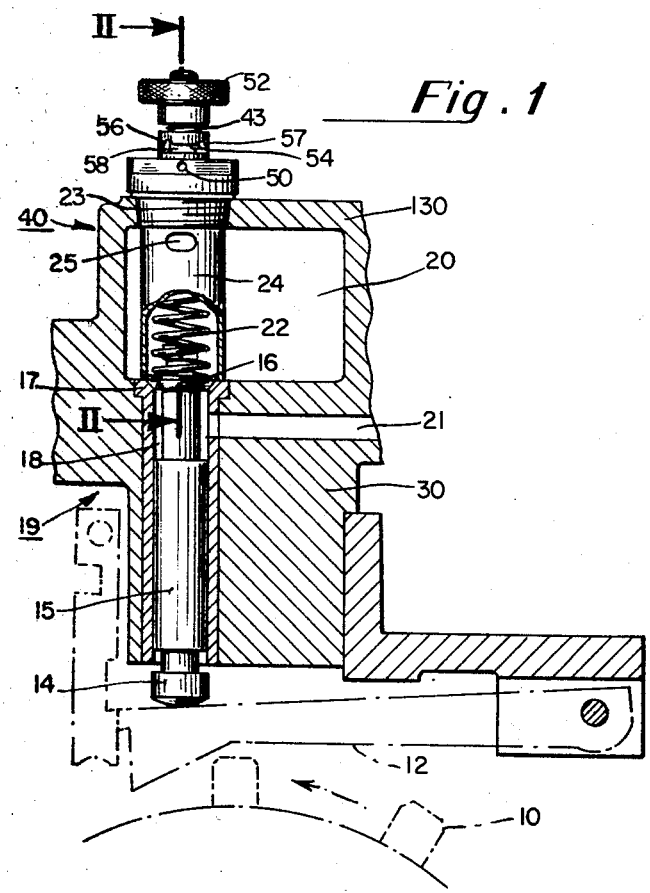
FIG. 1 is a view, in section, of one of the control valves of the multiple valve block showing the control valve equipped with a safety valve in accordance with the present invention.

In FIG. 1, there is shown in phantom, a timer cam drum having cam risers 10 which engage a cam lever 12. Cam lever 12 engages and lifts a cam follower 14 provided at the lower end of the valve stem 15 of the control valve 19. In this way, the valve closure element 16 is raised from the valve seat 17 against the biasing action of a compression spring 22 which is contained within a cylindrical gas-impervious extension tube 24 mounted above the control valve 19. Extension tube 24 has opposed apertures 25 in its wall near the upper end of the tube which register with opposed lateral passages 26 through the wall of base element 41 and also with opposed passages 48 through the wall of the stem 43 of the safety valve 40, as will be described.

Figure 2:
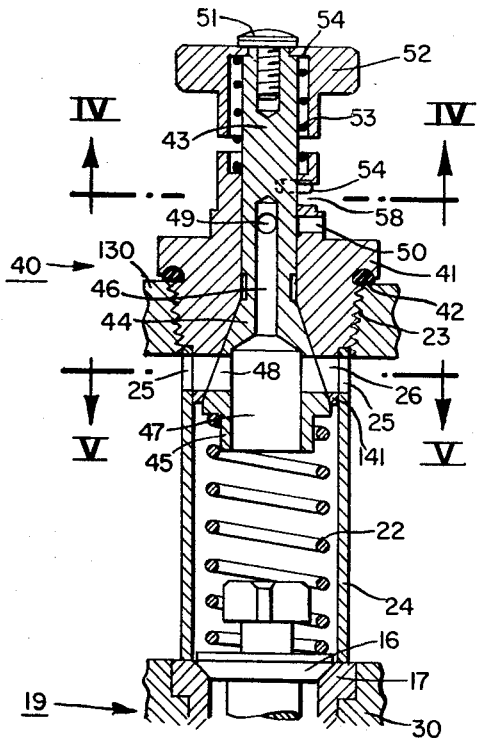
FIG. 2 is an enlarged view, in section, showing the control valve and safety valve, with the safety valve in position in which the vent to atmosphere is closed.

When the safety valve 40 is in the position shown in FIG. 2 and the valve closure element 16 of control valve 19 is lifted from its seat 17 by the action of cam elements 10 and 12, compressed air (or other gas) from the common manifold 20 passes through the open control valve into the annular chamber 18 of the control valve and out through the passageway 21, thereby to operate a section or component part of a machine, as for example, to extend or to retract the 90° push-out of a glassware making machine.

In the conventional prior art machine, the upper end of the control-valve biasing spring 22 engages the under surface of a plug (not shown in the present drawing) which closes the threaded hole 23 of the body portion of the valve block 30. In accordance with the present invention, the plug referred to above is replaced by a safety valve 40, the details of which will now be described.

The safety valve 40 includes an externally threaded base element 41 which is inserted into the tapped hole 23 in the valve body 30 which when fully inserted extends both inside and outside the wall 130 of the valve body 30. An O-ring 42 seals against leakage. Base element 41 has a center bore 141 which extends completely through the base element on the axis thereof. The inward portion of the axial bore 141 is conical, being of gradually increasing diameter in the inward direction.

Inserted into the bore 141 is a stem 43 the lower portion 44 of which is conical and carefully sized to fit snugly within the conical portion of the bore 141. Below the conical portion 44 of stem 43 is a short cylindrical portion 45 of reduced diameter forming therebetween a shoulder which receives the upper end of the compression spring 22. Thus, spring 22 not only biases the control valve 19 to closed position, it also biases the stem 43 upwardly (outwardly).

Stem 43 is provided with a bore 46 which extends from above (or outside) the wall 130 of the valve body to the lower end of the stem, within the extension tube 24. The upper portion of bore 46 is of smaller diameter but the lower portion is of substantially larger diameter, identified as 47 in the drawing. A pair of opposed lateral passages 48 extend through the wall of the conical portion 44 of the stem 43 just inside the wall 130 of the valve body. These passages 48 register with a pair of opposed lateral passages 26 provided in the wall of the base element 41 when the stem of the safety valve is in the angular position shown in FIG. 2. In this position, both pairs of passages 48 and 26 are in registry with the apertures 25 in the wall of the extension tube 24. This is the position of the safety valve stem during normal operation of the glass-making machine, and is shown in FIG. 2.

Near the upper end of the axial bore 46 is a radial passage 49 which is closed when the stem 43 is in the angular position shown in FIG. 2. However, when the stem is turned 90° to the position shown in FIG. 3, passage 49 registers with a lateral hole 50 in the base 41 outside the valve body wall 131, and thereby provides communication to the atmosphere.

Figure 4:
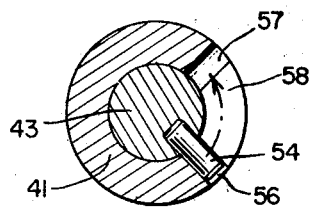
FIG. 4 is a view in section looking up along the line IV—IV of FIG. 2.
Figure 5:
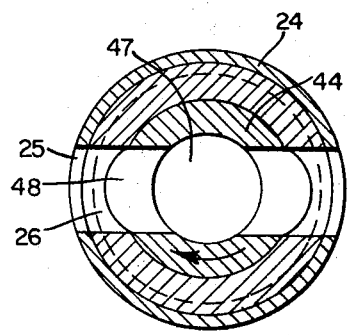
FIG. 5 is a view in section looking down along the lines V—V of FIG. 2.

A truss head screw 51 is threaded into a tapped hole in the upper end of stem 43 and holds a handle 52 down on the upper end of the stem 43 against the action of a compression spring 53 which surrounds the stem 43 and which extends between a shoulder 54 in the handle 52 and a shoulder formed in an annular recess in the upper end of the base element 41. A radial pin 54 in the stem 43, shown in details in FIG. 4, functions as an indexing device. Due to the lifting thrust of springs 22 and 53, pin 54 normally lodges in one of two indexing grooves 56 or 57 which are provided in the undersurface of the cutout portion of base element 41 formed by the radial slot 58.

Figure 3:
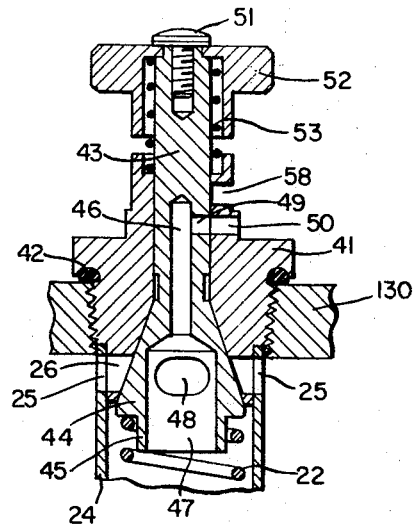
FIG. 3 is a view, in section, similar to FIG. 2, but showing the safety valve after it has been rotated through 90° to cut off communication between the source of compressed air and its associated control valve and to open the vent of the safety valve to atmosphere.

When the repairman wants to turn the safety valve 40 to the protecting position shown in FIG. 3, he depresses the handle 52 and stem 43 to dislodge the pin 54 from groove 56, and, then with the handle 52 and stem 43 held depressed, he turns the handle 52 counterclockwise through 90°, whereupon he releases the handle to allow the pin 54 to lodge in the indexing groove 57. In this angular position of the stem 43 (shown in FIG. 3) the radial passage 49 is in registry with the hole 50 in the base element 41, thereby providing communication between the interior of tube 24 and atmosphere by way of open ended bore 47, bore 46, lateral passage 49 and lateral hole 50. Also in this position of stem 43, communication between the common manifold 20 and the interior of the tube 24 is cut off by the wall of the conical portion of the stem 43 moving into position at the passages 26 in the base element 41, and the passages 48 in the stem 43 moving into position at the wall of the base element 41. As a result, compressed air from manifold 20 is no longer able to flow into the interior of the tube 24, and any compressed air which may be trapped in the tube 24 is vented to atmosphere.

What is claimed is:
1. In the combination of a valve body having a chamber for compressed gas and a utilization passage; a control valve between said chamber and said utilization passage for controlling communication therebetween; and a gas impervious tube covering the closure element of said control valve but having at least one aperture in its wall for providing communication between said control valve and said chamber; the improvement comprising the provision of a safety valve, said safety valve comprising:
  (a) a base threaded in the wall of said valve body in coaxial alignment with said tube and projecting thereinto;
  (b) an axial bore through said base extending from outside side valve body to within said tube;
  (c) at least one lateral passage through the wall of said base inside said tube and adapted to register with said aperture in the wall of said tube;
  (d) a stem extending through the axial bore of said base and projecting into the interior of said tube;
  (e) an axial bore in said stem extending from a point beyond said valve wall and opening inside said tube;
  (f) at least one lateral passage in said stem extending through the wall of said stem within said tube at the level of the registered base passage and tube wall aperture and adapted when said stem is in one of two indexing positions to register with the said passage and aperture, thereby to provide communication between said compressed-gas chamber and said control valve;
  (g) a lateral passage through the wall of said stem at a point beyond the wall of said valve body;
  (h) a lateral slot in said base at a point beyond said valve-body wall and adapted when said stem is in the other of its two indexing positions to register with said last named lateral passage to provide communication from the axial passage in said stem to atmosphere;
  (i) said stem in said other of its two indexing positions blocking communication between said chamber and the interior of said tube, but providing a vent to atmosphere from the interior of said tube by way of the axial passage in said stem and the lateral passages in said stem and base.

2. Apparatus according to claim 1 characterized in that said isolation tube has a pair of opposed apertures, in that safety-valve base has a pair of opposed lateral passages, and in that said stem has a pair of opposed lateral passages, said apertures and said lateral passages being in registry when said safety-valve stem is in said one of its two indexing positions.

3. Apparatus according to claim 2 characterized in that the inward end portion of said base axial bore, and an inward end portion of said stem, are correspondingly conical with the larger diameter being at the inward end.

4. Apparatus according to claim 3 characterized in that a compression biasing spring is inserted between the inward end of said stem and the valve closure element of the control valve.

References Cited

UNITED STATES PATENTS 3,094,143   6/1963   Beach _____ 251—310 XR

HENRY T. KLINKSIEK, Primary Examiner

U.S. Cl. X.R.
251—310